UNITED STATES PATENT OFFICE.

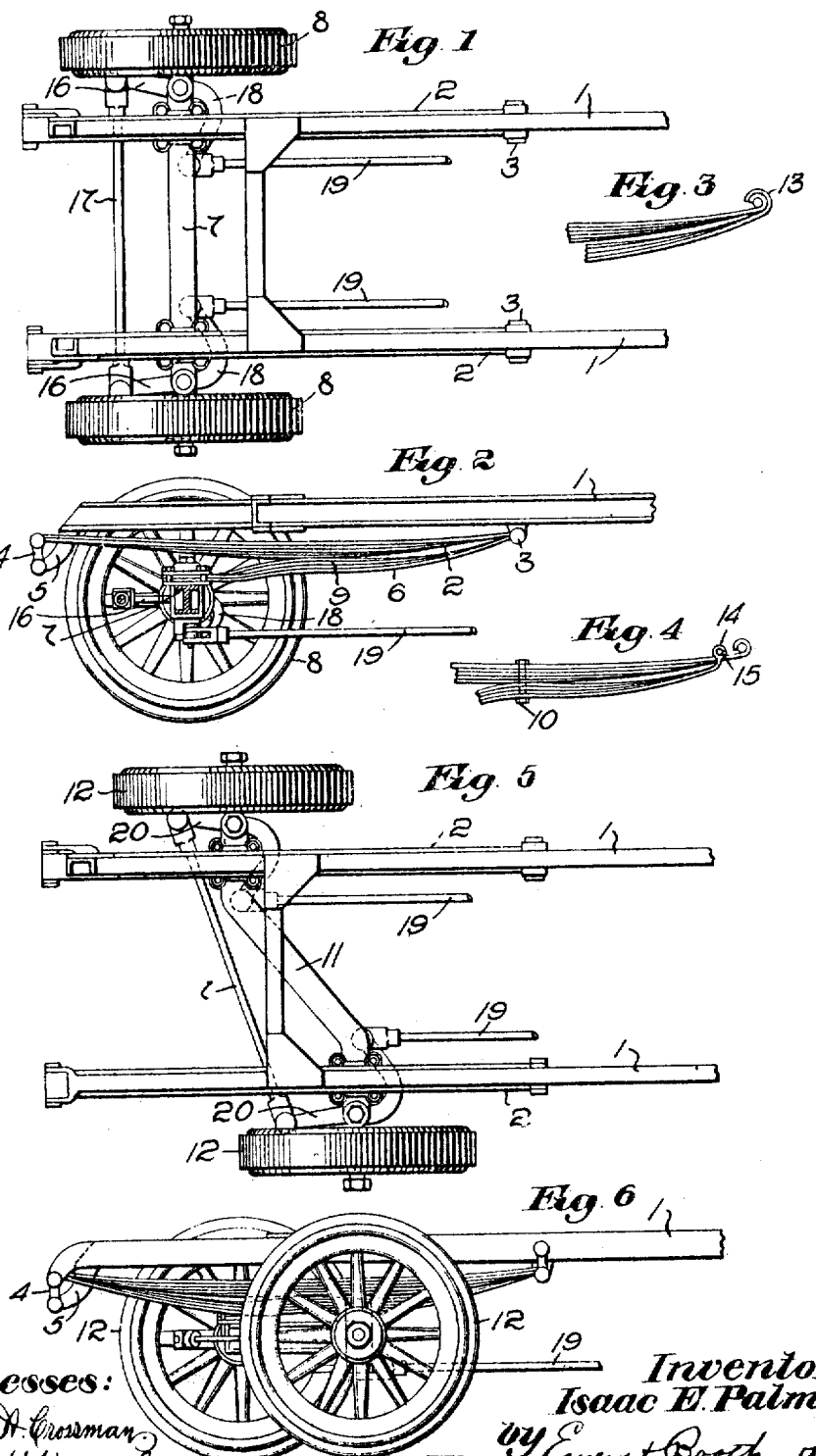

ISAAC E. PALMER, OF MIDDLETOWN, CONNECTICUT.

TRACKLESS POWER-DRIVEN VEHICLE.

939,158. Specification of Letters Patent. Patented Nov. 2, 1909.

Original application filed November 13, 1908, Serial No. 462,361. Divided and this application filed May 6, 1909. Serial No. 494,348.

*To all whom it may concern:*

Be it known that I, ISAAC E. PALMER, a citizen of the United States, and a resident of Middletown, in the county of Middlesex and State of Connecticut, have invented an Improvement in Trackless Power-Driven Vehicles, of which the following description, in connection with the accompanying drawings, is a specification, like numerals on the drawings representing like parts.

This invention relates to trackless, power driven vehicles and has more particularly for its object to provide means whereby either the front or rear wheels or both front and rear wheels of a vehicle may be readily changed in position so that the members of any pair of wheels may be arranged in or out of transverse alinement or the amount of non-alinement be altered.

This application is a division of my copending application Serial No. 462,361, filed Nov. 13, 1908.

In order that the principles of the invention may be clearly understood, I have disclosed a single type or embodiment thereof in the accompanying drawings, wherein—

Figure 1 is a plan view of the forward portion of an automobile, the forward wheels being shown as in transverse alinement; Fig. 2 is a view partially in side elevation and partially in vertical section of the construction shown in Fig. 1; Figs. 3 and 4 are details representing slightly modified connections for the main and supplemental springs; Fig. 5 is a view similar to Fig. 1, but representing the wheels as out of transverse alinement; and Fig. 6 is a side elevation of the construction shown in Fig. 5.

Referring more particularly to that specific embodiment of my invention herein shown, the body frame of the automobile is represented at 1, it being of any suitable type and construction. The front only of the automobile body is herein represented. I contemplate the provision of suitable means for mounting the front wheels (or if desired other wheels of the vehicle) in such manner as will permit the ready changing of the wheels from a transversely alining position to a transversely non-alining position, or such as will permit change in the amount of non-alinement. While this result may be variously accomplished, I have in the drawing represented each side of the front of the vehicle as provided with main springs 2—2 suitably and preferably pivotally connected at their opposite ends to the body frame. In Fig. 2, I have represented the main springs 2 as directly connected at one end to a bolt 3 carried by the body frame and as connected at the other end by a pivotal link 4 to a bracket 5. The two main springs 2—2 are preferably arranged in transverse alinement as indicated. To each main spring or to any other suitable support, I connect in any suitable manner one end of a supplemental spring 6, the opposite end of each supplemental spring being free and, at the desired distance from the front of the vehicle having suitably connected thereto the axle 7 upon which are mounted for deflecting movement the wheels 8—8. Intermediate its ends, each supplemental spring 6 has a bearing engaging with its main spring 2, as represented at 9 in Fig. 2. While the supplemental spring 6 is represented as merely bearing against the main spring 2 at the point 9, it is apparent that it may be bolted or otherwise secured thereto at such point as indicated at 10 in Fig. 4. In Fig. 1, the axle 7 upon which the wheels 8—8 are mounted is represented as straight, said wheels being in transverse alinement. In such case, the supplemental springs 6—6 are both connected to the rear ends of the main springs 2—2 and extend forwardly, or they may be connected to the front end of said main springs and extend rearwardly. If it be desired to mount the wheels out of transverse alinement, an inclined axle 11, such as indicated in Fig. 5, is preferably employed, the wheels 12—12 being mounted for deflection upon opposite sides thereof. In such case, one of the supplemental springs 6 is connected at its rear to its main spring 2 and the other supplemental spring 6 is preferably connected at its forward end to its main spring 2, the said supplemental springs thus having their free ends oppositely directed. Under such conditions, the free ends of the supplemental springs 6—6 are out of transverse alinement, and hence the axle 11 is readily secured thereto in such manner as to position the wheels 12—12 out of transverse alinement. I may readily alter a vehicle having its wheels in transverse alinement by disconnecting one of the supplemental springs 6 and reversing it.

It is, of course, evident that when I arrange the supplemental springs with their free ends extending in the same direction, such free ends may extend either toward the front or toward the rear of the vehicle.

The main spring 2 may be connected in any suitable manner to the body frame 1. For example, it may, as shown in Figs. 3 and 4, be hooked over or about the bolt 3. The supplemental spring may be hooked about the end of the main spring, as indicated at 13 in Fig. 3, or it may be provided with upstanding ears 14, as shown in Fig. 4, rising on opposite sides of the main spring and connected by a cross bolt 15 in such manner as to permit movement of this end of the spring with respect to the main spring 2. Preferably such a construction is employed where the supplemental spring 6 is bolted or otherwise secured to the main spring 2 at the bearing point 9. The said supplemental springs may be otherwise supported or connected, if desired.

Any suitable means may be employed to deflect the wheels 8—8 or 12—12. Herein for the purpose I have shown in Fig. 1 the wheels 8—8 as provided with lever arms 16—16 connected at their forward ends by a link 17 suitably connected with the steering mechanism in any desired manner. The opposite lever arms 18—18 are connected by links 19—19 to the deflectable rear driven wheels or in any other suitable manner.

The steering mechanism for the non-alined wheels 12—12 may be similar to that shown in Fig. 1, with the exception that the lever arms 20, 21 are of unequal length to impart differential deflecting movement, the lever arm 21 being longer for this purpose, as more fully described in my Patent No. 884,960.

It is apparent that the rear pair of wheels may be mounted in the manner described with respect to the front wheels, or that if more than two pairs of wheels be employed any or all of said pairs may be so mounted.

It is evident that my described construction of main and supplemental springs may in certain cases be used to support a single wheel, such as an intermediate or third wheel of an automobile.

Having thus described one illustrative embodiment of my invention, I desire it to be understood that although specific terms are employed, they are used in a generic and descriptive sense, and not for purposes of limitation, the scope of the invention being set forth in the following claims.

Claims.

1. Running gear for trackless, power driven vehicles comprising in combination a body frame, two main springs at opposite sides of the body frame and respectively connected to each side of and extending below the said body frame, each of said two main springs being connected at both of its ends to the body-frame, two supplemental springs each located below and having a bearing engagement intermediate its ends with its respective main spring and also connected at one end to said main spring, a pair of substantially opposite wheels upon opposite sides of the vehicle, and an axle to which both wheels of said pair of wheels pertain, said axle being connected to and supported by said supplemental springs respectively.

2. Running gear for trackless, power driven vehicles comprising in combination, a body frame, a main spring connected to each side of the body frame, a supplemental spring connected to each of said main springs but having a free end, a pair of wheels upon opposite sides of said vehicle and an axle to which both wheels of said pair of wheels pertain, said wheels being out of transverse alinement, and said axle being connected to the free ends of said supplemental springs and supported thereby.

3. Running gear for trackless, power driven vehicles comprising in combination, a body frame, a main spring connected to each side of the body frame, a supplemental spring connected to each of said main springs but having a free end, the free ends of said springs extending forwardly, and rearwardly respectively, a pair of wheels upon opposite sides of said vehicle and an axle to which both wheels of said pair of wheels pertain, said axle being connected to the free ends of said supplemental springs and supported thereby.

4. Running gear for trackless, power driven vehicles comprising in combination, a body frame, a main spring connected to each side of the body frame, a supplemental spring connected to each of said main springs but having a free end, the free ends of said springs extending forwardly and rearwardly respectively, a pair of wheels upon opposite sides of said vehicle and an axle to which both wheels of said pair of wheels pertain, said wheels being out of transverse alinement and said axle being connected to the free ends of said supplemental springs and supported thereby.

5. Running gear for trackless, power driven vehicles comprising in combination a body frame, a main spring connected thereto and extending below the same into wheel supporting position, said main spring being connected at both of its ends to said body-frame, a supplemental spring upon the same side of the vehicle as and connected to said main spring at one end and having bearing relation therewith, and having an opposite free end, said supplemental spring being located below said main spring, and a wheel connected to and supported by the free end of said supplemental spring, upon that side of the vehicle whereon said main and supplemental springs are both situated.

6. Running gear for trackless, power driven vehicles comprising in combination, a body frame, a main spring having its opposite end portions connected thereto, a supplemental spring connected at one end to said main spring and having its opposite end free, and having a bearing engagement with said main spring intermediate its ends, and a wheel connected to and supported by the free end of said supplemental spring.

7. Running gear for trackless, power driven vehicles comprising in combination, a body frame, two main springs located below and at opposite sides of the body frame and connected at both ends to the respective sides of said body frame, two supplemental springs, each located below and supported at the body frame at one end adjacent its respective main spring and also having a bearing engagement therewith between the ends of said supplemental spring, each of said supplemental springs having an opposite free end below the said body frame and an axle arranged transversely of the vehicle and connected to the said free ends of said supplemental springs.

8. Running gear for trackless, power driven vehicles comprising in combination a body frame, a main spring connected at both ends to each side of the body frame, an axle arranged transversely of the vehicle and intermediate the ends of the said main springs, and supplemental springs having free ends connected to said axle and their opposite ends supported by the vehicle, said supplemental springs having a bearing engagement with said main springs intermediate their ends.

9. Running gear for trackless, power driven vehicles comprising in combination a body frame, a main spring having its opposite end portions connected thereto, a supplemental spring connected at one end to said main spring and having its opposite end free and having a bearing engagement with said main spring intermediate the ends of said main spring, and a wheel connected to and supported by the free end of said supplemental spring.

In testimony whereof, I have signed my name to this specification, in the presence of two subscribing witnesses.

ISAAC E. PALMER.

Witnesses:
FRED. E. FOWLER,
CHAS. M. LAUER.